United States Patent [19]
Miura

[11] Patent Number: 4,563,697
[45] Date of Patent: Jan. 7, 1986

[54] SEMICONDUCTOR PRESSURE SENSOR

[75] Inventor: Shunji Miura, Matsumoto, Japan

[73] Assignee: Fuji Electric Company, Ltd., Kawasaki, Japan

[21] Appl. No.: 466,125

[22] Filed: Feb. 14, 1983

[30] Foreign Application Priority Data

Feb. 25, 1982 [JP] Japan ............................. 57-29296

[51] Int. Cl.⁴ ............................................ H01L 29/84
[52] U.S. Cl. ...................................... 357/26; 357/80; 357/74; 174/52 H; 174/50.54
[58] Field of Search ....................... 357/80, 26, 74; 174/52 H, 50.54

[56] References Cited

U.S. PATENT DOCUMENTS

| | | | |
|---|---|---|---|
| 4,127,840 | 11/1978 | House | 357/26 |
| 4,172,261 | 10/1979 | Tsuzuki et al. | 357/80 |
| 4,218,694 | 8/1980 | Grzybowski | 357/80 |
| 4,287,501 | 9/1981 | Tominaga et al. | 357/26 |
| 4,314,225 | 2/1982 | Tominaga et al. | 357/26 |
| 4,314,226 | 2/1982 | Oguro et al. | 357/26 |

FOREIGN PATENT DOCUMENTS 71021 12/1981 Japan.
1248087 9/1971 United Kingdom.

Primary Examiner—Martin H. Edlow
Assistant Examiner—Jerome Jackson
Attorney, Agent, or Firm—Brumbaugh, Graves, Donohue & Raymond

[57] ABSTRACT

A semiconductor pressure sensor has a sealing reference pressure chamber container formed by a cap and a metal bottom plate, a semiconductor pressure sensitive diaphragm to which pressure to be measured is applied on the side of the diaphragm opposite to the inside space of said container, and a circuit substrate having a circuit connected to a strain gauge mounted on the pressure sensitive diaphragm. The diaphragm is mounted to said bottom plate, and the circuit substrate is fixed to one side of a metal plate having a thermal expansion factor approximately equal to the thermal expansion factor of the circuit substrate material. The other side of the metal plate is fixed to said bottom plate only over a relatively small area. The arrangement reduces thermal stress to the circuit substrate.

4 Claims, 3 Drawing Figures

SEMICONDUCTOR PRESSURE SENSOR

BACKGROUND OF THE INVENTION

The present invention relates to a semiconductor pressure sensor and more particularly to a semiconductor pressure sensor having a container which forms a reference pressure chamber, a semiconductor pressure sensitive diaphragm to which an external pressure is applied on the side opposite to the space inside the container, and a circuit substrate on which a circuit connected to the strain gauge of the pressure sensitive diaphragm is mounted.

One type of pressure sensor, proposed by the present applicant et al. in Japanese Patent Application No. 71021/1980, attempts to improve the mechanical and thermal stabilities of a conventional pressure sensor, and consists of a resin mold, a container which house only a pressure sensitive diaphragm, and wherein an amplifier circuit and other components are installed on a circuit substrate provided outside the container. An example of this is shown in FIG. 1, in which a metal package, for example MD18 or equivalent, consisting of a metal cap 1 and a metal substrate or stem 2 which may also be used in a semiconductor device, is used as a container of the sensor. The stem 2 is provided with a central opening 3, in which a cylindrical pedestal 4 of silicon is disposed. The pedestal 4 is centrally provided with a through hole 5, over which a silicon pressure sensitive diaphragm 6 is fixed such that it plugs up the hole. The pedestal is joined to a pressure guiding pipe 7 so that the through hole 5 is in communication with the inside of the pipe 7, which is supported by the stem 2 via a metal cap 8. A ceramic substrate 9 is fixed on the upper surface of the stem 2 so that it surrounds the pressure sensitive diaphragm 6. On the ceramic substrate 9 a thick film circuit (not shown) is formed, and operational amplifier chips, diode chips, and other components are installed through the thick film circuit to form amplifier circuits and adjustment circuits, which are connected to the bridge of a strain gauge formed on the pressure sensitive diaphragm 6 through thin bonded lead wires 10.

The outputs of the adjustment and amplifier circuits are connected to a post 11 via a thin bonded lead wire 12. This post 11 is insulated from the stem 2 by an hermetic seal. As such, the output of the sensor is available outside the container through an output lead line 13 connected to the post 11. The output depends on the difference between a pressure undergoing measurement, that is guided to one side of the pressure sensitive diaphragm 6 from the pressure guiding pipe 7 through the through hole 5 in the pedestal 4, and the pressure in the reference pressure chamber 14 within the cap 1. Therefore, by setting the pressure in the reference pressure chamber 14, one can set the sensor output level. For protecting the pressure sensitive diaphragm, the thick film circuit on the ceramic substrate or the semiconductive chip within the container, helium or inert gas containing helium is admitted through a sealing pipe 15 until the level of the sensor output reaches a predetermined value, whereupon the admittance of the gas is stopped and the pipe 15 is sealed off, thus effecting the aforementioned setting.

In the sensor, if iron having a thermal expansion factor of $11.7 \times 10^{-6}$ is used as the material of the stem 2, for example, then the difference between the expansion factor of iron and that of the ceramic substrate 9 ($7 \times 10^{-6}$) will cause a stress to be produced when the substrate 9 is brazed to the stem 2 with soft solder. This stres will cause the resistances of the resistors printed on the substrate 9 to be affected, and a resistance variation on the order of 1% may sometime occur. In order to prevent generation of such a stress, it has been suggested that the substrate 9 be partially brazed to the stem 2 with soft solder. However, since the adhesive strength between a metal and a ceramic is generally weak when soft solder is used, a partial joining in only a relatively small area is insufficient to create adequate adhesion, and a relatively large area of joining is therefore required. It has also been suggested to employ an adhesive which does not need heating much different from soft solder, but such an adhesive produces some problems including insufficiency of the adhesion and generation of a stress in the substrate 9 caused by temperature change during use.

SUMMARY OF THE INVENTION

Accordingly, it is an object of the present invention to provide a semiconductor pressure sensor in which a substrate of a ceramic circuit that is sealed together with a pressure sensitive diaphragm within a container does not experience any substantial stress.

This object is accomplished by providing a semiconductor pressure sensor which has a sealing reference pressure chamber container formed by a cap and a metal bottom plate, a semiconductor pressure sensitive diaphragm to which pressure to be measured is applied on the side of the diaphragm opposite to the inside space of said container, and a circuit substrate having a circuit connected to a strain guage mounted on the pressure sensitive diaphragm. The diaphragm is mounted to said bottom plate, and the circuit substrate is fixed to one side of a metal plate having a thermal expansion factor approximately equal to the thermal expansion factor of the circuit substrate material. The other side of the metal plate is fixed to said bottom plate only over a relatively small area. The arrangement reduces thermal stress to the circuit substrate.

BRIEF DESCRIPTION OF THE DRAWINGS

Examples of the present invention are described hereinafter with reference to the figures, in which like parts are indicated by like numerals.

DETAILED DESCRIPTION OF THE PREFERRED EMBODIMENT

Figure 1:
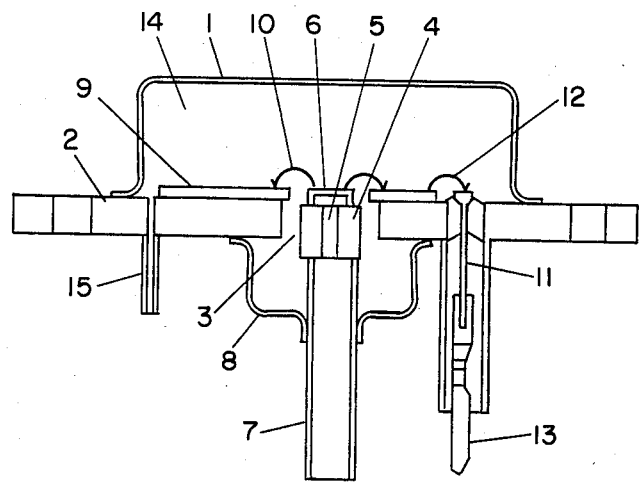
FIG. 1 is a cross sectional view of a prior art semiconductor pressur6 sensor.
Figure 2:
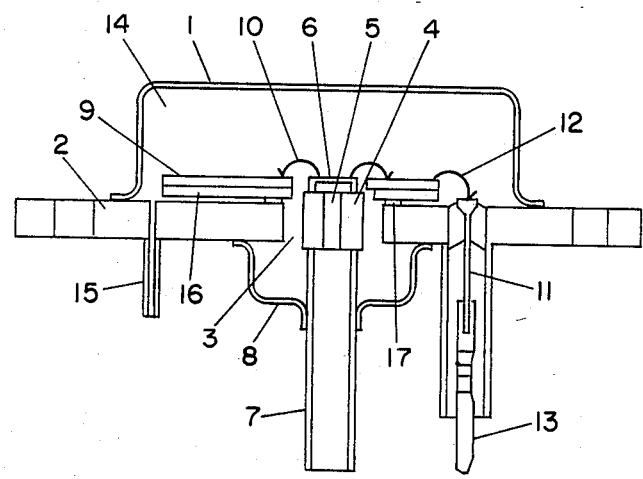
FIG. 2 is a cross sectional view of one embodiment according to the present invention.

Referring to FIG. 2, a ceramic substrate 9 is joined to a supporting plate 16, consisting of an alloy of iron and nickel. The joining is effected by brazing, rather than by directly fixing the substrate 9 to the stem 2. The alloy has a thermal expansion factor approximately equal to that of the ceramic substrate 9. The supporting plate 16 is joined to the stem 2 only locally near the opening 3, and only with a soft layer of solder 17, for example. In this construction, when the ceramic substrate 9 is joined to the supporting plate 16, substantially no thermal stress is produced, because the thermal expansion factors of the substrate 9 and plate 16 are approximately equal to each other. Also, since the supporting plate 16 is coupled to the stem 2 only locally and not over the entire area, substantially no thermal stress arises. Further, if the plate 16 and the stem consist of metals, the adhesion due to brazing, welding or the like is much stronger than the adhesion between a metal and a ceramic. Hence, joining in only a localized area will suffice for the amount of adhesion needed.

Figure 3:
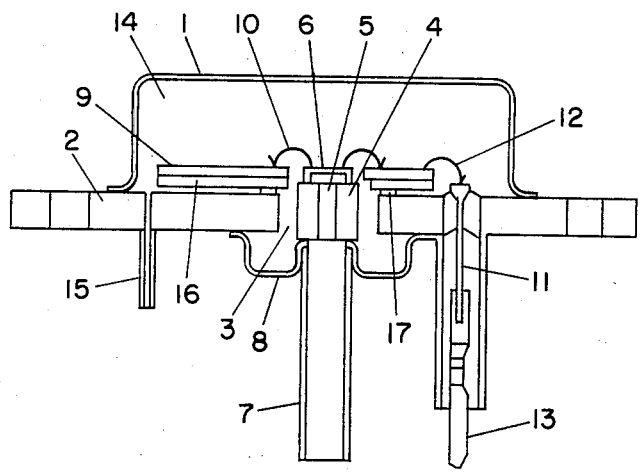
FIG. 3 is a cross sectional view of another embodiment according to the invention.

Referring now to FIG. 3, there is shown another novel construction for a pressure sensor which is substantially similar to the example in FIG. 2, except that the pedestal 4 supporting the pressure sensitive diaphragm 6 is fixed to the metal cap 8 to which the pressure guiding pipe 7 is joined.

The variation in the output voltage of the novel constructions caused by temperature change is quite small, because change in the resistances of the resistors on the ceramic substrate is kept less than 0.1%, even for temperature changes from −40° to +120° C.

As stated above, in accordance with the present invention, a circuit substrate is fixed to a supporting plate consisting of a metal having a thermal expansion factor approximately equal to that of the substrate material so that neither brazing nor temperature change during use produces any substantial stress in the circuit substrate which is sealed in a container together with a semiconductor pressure sensitive diaphragm. The supporting plate and the bottom plate of the container are adhered to each other over a localized area only, since the metal-to-metal joining has a sufficient adhesive intensity as by brazing, so that any stress arising from a difference between the thermal expansion factors is substantially avioded. Thus, a high precision semiconductor pressure sensor which is free from thermal stress is provided.

From the foregoing, it will be observed that numerous variations and modifications may be effected without departing from the true spirit and scope of the novel spirit of the invention. It is to be understood that no limitation with respect to the specific apparatus illustrated here is intended or should be inferred. It is, of course, intended to cover by the appended claims all such modifications as fall within the scope of the claims.

What is claimed is:

1. A semiconductor pressure sensor comprising:
   a sealing reference pressure container formed by a cap and a metal bottom plate having a pedestal disposed substantially at the center of said metal bottom plate, wherein said pedestal is mounted on a pressure guiding pipe to communicate air from the environment, and wherein said metal bottom plate has a bottom metal cap connected thereto and to said pedestal, and wherein said guiding pipe is connected to said bottom metal cap and extends through an opening in said bottom metal cap;
   a pressure sensitive diaphragm of semiconductor material accommodated within said sealed reference pressure container and attached to said pedestal of said metal bottom plate but having communication with the environment outside said reference pressure chamber by receiving air traveling through said pressure guiding pipe;
   a supportng metal plate accommodated within said sealed reference pressure container and attached to the metal bottom plate only over a relatively small area of the interface between the supporting metal plate and the metal bottom plate, said small area of attachment effectively mounting the metal supporting plate to the metal bottom plate;
   a ceramic circuit substrate accommodated within said sealed reference pressure chamber and attached to the upper surface of said supporting metal plate over substantially the entire interfacing area between said ceramic circuit substrate and its supporting metal plate;
   a strain gauge circuit connected to the pressure sensitive diaphragm, and connected to an output lead which provides an output signal indicative of the pressure in the environment; and
   wherein the thermal expansion factors of the supporting metal plate and said ceramic circuit substrate are approximately equal, to reduce thermal stress to the circuit substrate.

2. The semiconductor pressure sensor as set forth in claim 1 wherein the supporting metal plate is attached to the metal bottom plate by brazing with soft solder.

3. The semiconductor pressure sensor according to claim 1 further including a sealing pipe extending from said metal bottom plate for admitting reference gas into said sealing reference pressure container.

4. The semiconductor pressure sensor according to claim 1 including a post extending from the metal bottom plate and attached thereto by an hermetic seal, and wherein said post is connected to the output lead of the strain gauge by a thin bonded lead wire, and wherein an output lead line is connected to the post to provide an output indicative of the pressure measured in the environment.

* * * * *